Figure 13:
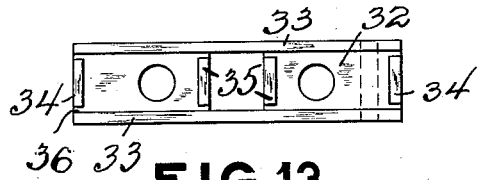

Sept. 16, 1941.     J. ORMOND     2,255,894
METHOD OF FORMING THE SHEARING HEADS OF DRY SHAVERS
Filed July 15, 1939     2 Sheets-Sheet 1
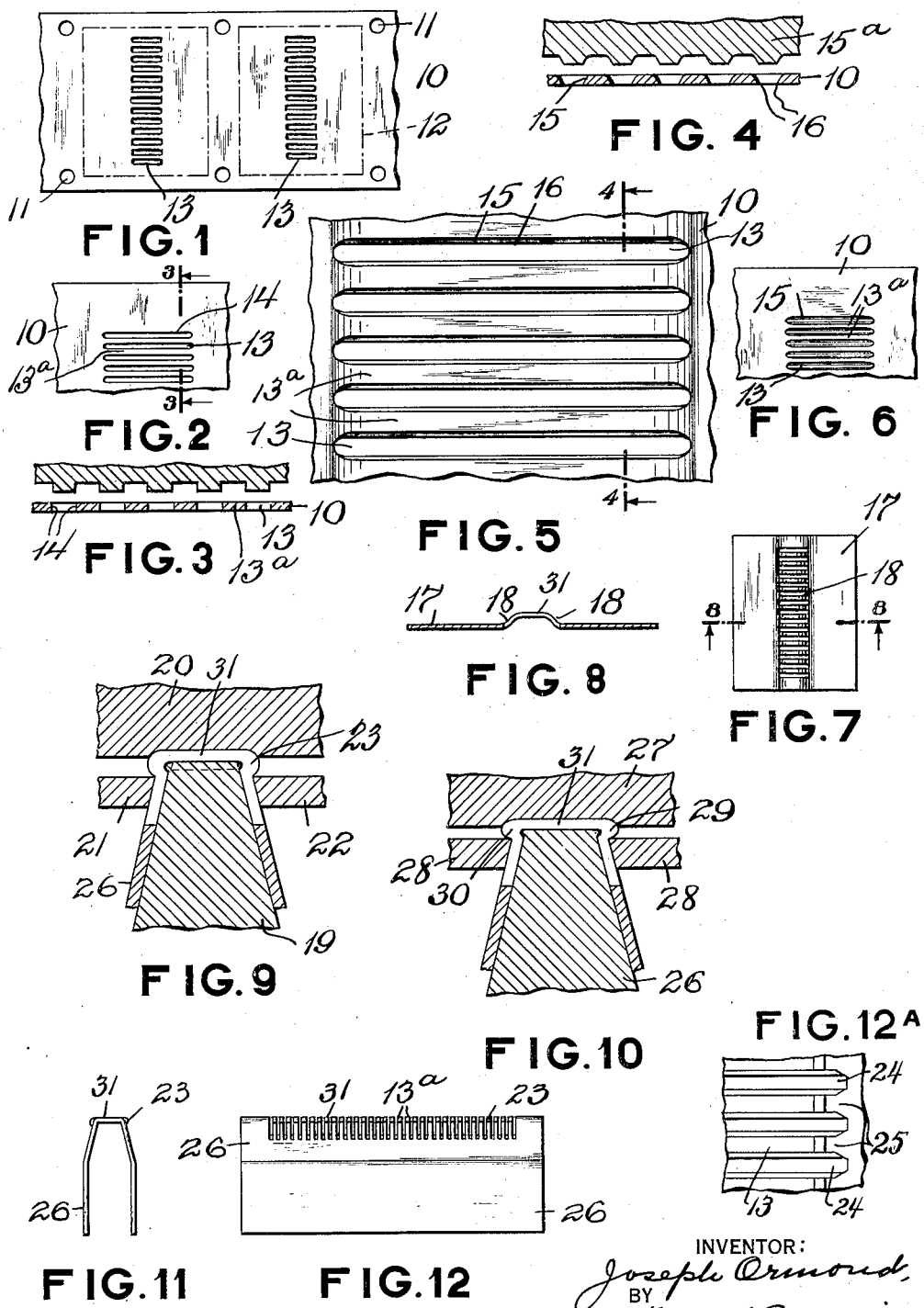

Sept. 16, 1941.　　　　　J. ORMOND　　　　　2,255,894
METHOD OF FORMING THE SHEARING HEADS OF DRY SHAVERS
Filed July 15, 1939　　　2 Sheets-Sheet 2

INVENTOR
Joseph Ormond,
BY
Wm H Canfield.
ATTORNEY

Patented Sept. 16, 1941

2,255,894

UNITED STATES PATENT OFFICE 2,255,894

METHOD OF FORMING THE SHEARING HEADS OF DRY SHAVERS

Joseph Ormond, Newark, N. J., assignor to Schick Incorporated, a corporation of Delaware Application July 15, 1939, Serial No. 284,623

5 Claims. (Cl. 76—104)

This invention relates to an improved method of forming shearing heads of dry shavers which shavers are of the type having a fixed outer cutter and a movable inner cutter which cutters are slotted laterally of their longest dimension, the slots being parallel to the directional movement of the shaver as a whole when operated for shaving.

The present invention is designed to make it possible to manufacture the outer cutter of the shearing head at less cost than heretofore. As previously made such cutter or shearing heads, especially the outer or stationary cutters, were expensive in manufacture as they required slotting by means of fragile cutters of small gauge and successive grinding operations to provide comb-like edges and to taper the edge walls of the minute slots.

The object of this invention is to make it possible to provide an outer shearing head with no, or least a minimum of grinding as the head is made from a blank of sheet metal that is subjected to piercing, swaging and forming operations, which require a minimum of manual operations or handling, to produce a slotted head with overhanging comb-like edges at the ends of the blades. The blades are the narrow strips formed by slotting the face of the shearing head with parallel narrow slots each of which is wide enough to admit at least one human hair.

Another feature of the invention is the provision of a base which receives and supports the slotted member, the base and the member being soldered, welded or otherwise secured together after they have both been formed.

The invention is illustrated by drawings showing the various steps or operations to which the sheet metal of the articles is subjected, the said drawings being hereunto annexed. In said drawings, Figure 1 is a face view of several pierced blanks.

Figure 2 is an enlarged view of a part of one of the blanks. Figure 3 is an enlarged section on line 3—3 in Figure 2. Figure 4 is a section similar to Figure 3 but taken on line 4—4 in Figure 5 but with the swaging die shown in position over the blank and the blank showing the swaging operation completed. Figure 5 is an enlarged fragmentary view of the slotted part after the swaging is completed. Figure 6 is a smaller view of Figure 5 showing the blank in part. Figure 7 is a view of the swaged blank after it has been stamped out as a unit and preformed. Figure 8 is a section on line 8—8 in Figure 7. Figure 9 is a section showing the forming of the blank into an approximately U-shaped form with overhanging edges. Figure 10 is a successive operation to further compress and form the head into a sharper comb shape when such step is considered necessary. Figure 11 is an end view of the head fully formed. Figure 12 is a side view of the article shown in Figure 11. Figure 12A is an enlarged top view of the blades after forming is completed.

Figure 16:
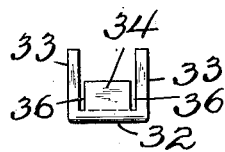
Figure 17:
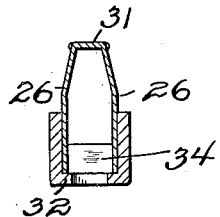
Figure 14:
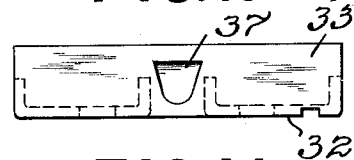
Figure 15:
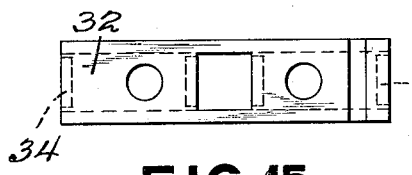
Figure 18:
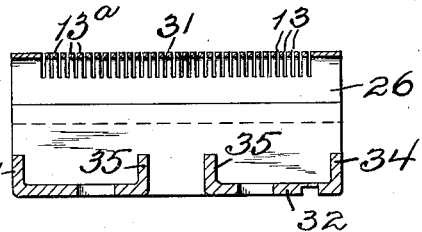
Figure 20:
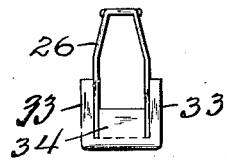
Figure 19:
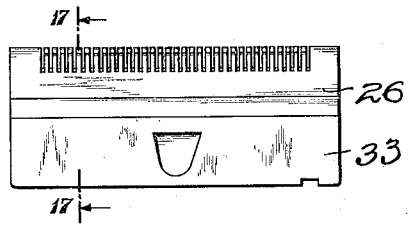

Figure 13 is a top view of the base by which the sheet metal head is supported. Figure 14 is a side view of the base shown in Figure 13. Figure 15 is a bottom view of the base. Figure 16 is an end view of the base. Figure 17 is a section of the base and cutter or shearing head assembled, taken on line 17—17 in Figure 19. Figure 18 is a longitudinal central section of Figure 17. Figure 19 is a side view of the assembled base and shearing head. Figure 20 is an end view of Figure 19.

In the manufacture of the shearing head a sheet of metal of proper thickness and preferably of sufficient length for usual shop practice is provided. The drawings show such sheet at 10 with the usual holes 11 for feeding the sheet or strip through a press. The strip is usually slightly oversize in width and the dimensions are such as to enable the striking out of a blank along the dotted lines 12 shown in Figure 1.

The sheet of metal is pierced by a suitable die to form the required number of small parallel slots 13. The slots are usually made with a width of about .011 of an inch in stock of about .012 to .014 in thickness. These dimensions can be varied if desired and are only indicative of the usual commercial size. The piercing of the slots leave the material at the side wall straight or parallel as at 14 in Figure 3.

The pierced blank is now subjected to a swaging operation by a die 15$^a$ which die is of proper design to compress or swage the blank and reduce its thickness and at the same time incline or slope the slide edges of the slots 13. The swaging operation, for example reduces stock of about .014 of an inch to a thickness of .011 of an inch and forces the material at the side edges of the blades 13 to a tapered formation of about 90 degrees to provide slots narrower than when pierced. The slots when pierced as in Figure 3 are oversize and after swaging are at the required width at the bottom. For instance, pierced slots of a width of .011 of an inch are swaged to have tapered walls of, say, 90 degrees with a width at the bottom of the slot of .0075 of an inch. The tapered walls are shown at 15 in Figures 4 and 5 and narrowed bottoms of the slots are shown at 16.

The strip 10 is now blanked out, on the lines 12, to the form shown at 17 in Figure 7 and then preformed as shown in section in Figure 8. In this preforming operation the slotted part of the blank is formed into a ridge or hump, but the humped part being left flat, and the ends of the blades, that is the slotted part, being inclined to merge with the part of the blank still in the original plane. These inclined parts are shown at 18 in Figure 8 and include the area of the edges of the slotted part.

The preformed blank is now placed on an arbor shown at 19 and formed into a substantially V-shaped or U-shaped piece shown particularly in Figures 11 and 12. This is done by a forming die 20 which strikes the top of the slotted portion or blades and two slides 21 and 22 of proper size and dimensions which slides press the sides of the blank inwardly below the preformed hump and thus form overhanging or extending combs 23 on the shearing head. This overhanging comb is formed from the slotted part of the blank and consists of the blades 13ª with the tapering side edges flared or tapered at the side of the projecting comb teeth so formed. These teeth are shown at 24 in Figure 12A and the tapered openings to guide hairs into the slots 13 are shown at 25.

The sides of the formed shearing head are shown at 26 and are preferably parallel near the bottom to provide a means for fastening the article above described to a base to be described hereinafter.

In the event that a more pronounced overhanging comb is desired the formed blank can again be placed on an arbor slightly lower and the die 27 forcibly brought down on the top of the shearing head while the slides 28 are pressed into the sides of the head directly below the comb. This forms a comb that projects slightly further than the comb 23 as at 29 with the ends 30 of smaller radius than the ends 23.

The finished cutting or shearing part of the head is thus produced with a slotted shearing portion that is flat or nearly so, shown at 31, the projecting combs 23 and the side walls 26 without any operation by grinders or slotting discs and consequently is produced much more economically than heretofore and in much less time.

The shearing head above described is mounted on a base for support and for easy and quick installation on the casing of an electric shaver.

The base preferred for this purpose is formed from a blank of sheet metal of heavier gauge than the shearing head proper. The blank is bent up into a trough-like holder with a bottom 32 and side flanges 33 which preferably extend the full length of the bottom. The blank is bent up to provide lateral flanges 34 at the ends and 35 near the center. The lateral flanges are slightly less in width than the bottom 32 and provide spaces 36 to snugly receive the walls 26 of the shearing head. The walls 26 are placed in these spaces and then soldered or welded to the side flanges 33 to provide the finished article shown in Figures 19 and 20.

The base may be stamped to provide desired configurations such as the recess 37 for the end of an attaching screw and holes 38 in the bottom 32 for spring pressure means applied to an inner cutter that reciprocates in the outer cutter and which is not described in this specification and is no part of this invention.

The improved method of producing a stamped shell for a shearing head may be modified as to dimensions of the slots and blades and the thickness of the shearing head face. The stamping of the slots 13 to form the blades 13ª, the preforming of the blank short of the end or ends of the blades 13ª and the final bending of the preformed blank to provide the comb teeth 24 at the ends of the blades 13² are the novel features embodied in the present invention.

I claim:

1. A method of forming shearing heads of dry shavers comprising the provision of a blank to form a series of parallel slots within the limits of said blank, the aforesaid piercing providing slots that are oversize, then swaging the pierced blank to reduce the thickness thereof and to taper the material at the side walls of the slots whereby the slots are reduced in width at the bottom to the desired size and forming blades between the slots, then bending the blank within the slotted portion and near the ends of the slots and forming side walls within the longitudinal dimension of the slotted portion, whereby an overhanging comb portion is produced, said comb portion having tapered entrances between the blades.

2. A method of forming a shearing head for dry shavers comprising the provision of a sheet of metal, piercing the metal to form slots separating thin and narrow blades, swaging the pierced blank to taper the sides of the blades and thus reduce the width of the slots at the bottom, and then bending the blank to form the ends of the slotted part into an overhanging comb-like projecting part.

3. A method of forming the shearing head of dry shavers comprising the provision of a blank of sheet metal, piercing the sheet of metal to form closely arranged narrow parallel slots forming thin blades, swaging the pierced blank to reduce the thickness of the blades and tapering the walls of the slot to diminish the width of slots at the bottom and form tapered edges at the bottom of the blades, then bending the blank within the ends of the slots to form overhanging comb-like ends to the blades and extending the imperforate part of the blank to form supporting side walls.

4. A method of forming the shearing head of dry shavers comprising the provision of a blank of sheet metal, piercing the sheet of metal to form closely arranged narrow parallel slots forming thin blades, swaging the pierced blank to reduce the thickness of the blades and tapering the walls of the slot to diminish the width of slots at the bottom of the blades, then bending the blank within the ends of the slots to form overhanging comb-like ends to the blades and extending the imperforate part of the blank to form supporting side walls, and then subjecting the formed head to second pressing on the top of the formed head to increase the projection of the comb.

5. The method of forming a shearing head for dry shavers comprising piercing a sheet metal blank to form a series of parallel, closely spaced elongated slots separating narrow blades, bending the blank along two spaced lines substantially at right angles to the lengths of the said slots and short of the ends thereof to form side walls which include the end portions of said slots beyond the bend lines and applying external pressure coincidently to the end face and to the side walls slightly below the end face while supporting the said side walls and end face internally against crushing to form the slotted corners into a comb overhanging the side walls.

JOSEPH ORMOND.